United States Patent [19]

Guntermann et al.

[11] Patent Number: 5,078,200
[45] Date of Patent: Jan. 7, 1992

[54] METHOD OF CAST-WELDING BETWEEN FINELY PEARLITIZED RAILS

[75] Inventors: Hans Guntermann, Essen; Frank Kuster, Ratingen, both of Fed. Rep. of Germany

[73] Assignee: Elektro-Thermit GmbH

[21] Appl. No.: 651,584

[22] Filed: Feb. 6, 1991

[30] Foreign Application Priority Data

Feb. 27, 1990 [DE] Fed. Rep. of Germany ....... 4006071

[51] Int. Cl.$^5$ ..................... B22D 19/04; B23K 23/00
[52] U.S. Cl. ..................................... 164/54; 164/108; 164/125; 164/126
[58] Field of Search ........... 164/54, 53, 108, DIG. 12, 164/125, 126, 128

[56] References Cited

U.S. PATENT DOCUMENTS

| | | | |
|---|---|---|---|
| 2,150,045 | 3/1939 | Ahlert | 164/54 |
| 3,189,959 | 6/1965 | Ahlert et al. | 164/54 |
| 3,942,579 | 3/1976 | Guntermann | 164/54 |
| 4,247,074 | 1/1981 | Stratmann et al. | 164/54 X |
| 4,724,890 | 2/1988 | Moser et al. | 164/54 |

FOREIGN PATENT DOCUMENTS 2266570 10/1975 France ........................... 164/128
1402964 8/1975 United Kingdom .

Primary Examiner—J. Reed Batten, Jr.
Attorney, Agent, or Firm—Toren, McGeady & Associates

[57] ABSTRACT

Aluminothermically produced steel is poured into a casting mold which surrounds the two rail ends. A cooling agent is applied to the surfaces of the rail heads of the rail portions adjacent the two casting mold halves. The cooling agent is applied after the molten steel has been poured into the casting mold until the steel has solidified. The cooling agent may be applied until the projecting material and the casting mold halves has been sheared off. A casting mold for carrying out the method includes two casting mold halves which each has a groove for receiving a sealing paste in the inner surfaces thereof facing the rail ends, wherein the groove extends along the outer contour of the casting mold halves.

6 Claims, 3 Drawing Sheets

METHOD OF CAST-WELDING BETWEEN FINELY PEARLITIZED RAILS

BACKGROUND OF THE INVENTION

1. Field of the Invention

The present invention relates to a method of cast-welding between finely pearlitized rails by pouring aluminothermically produced steel into a casting mold which surrounds the ends of the two rails.

The invention particularly relates to a method of cast-welding between finely pearlitized rails in which the rail head parts adjacent both sides of the welding seams have an increased strength which is approximately the same as that of the finely pearlitized rails.

2. Description of the Related Art

Under a given load during railroad operations, the wear of a rail is predominantly determined by the rail strength or hardness. At the present time, for continuously welded rails, the railroads utilize mostly naturally hard rails having a minimum tensile strength of 900 N/mm$^2$. For obtaining the rail strength, the alloy elements carbon and manganese are available to the rail manufacturers. In the case of substantially increased loads, as they occur, for example, in outer rails in curves, the naturally hard special grade steel which is additionally alloyed with chromium and/or vanadium and has a minimum tensile strength of 1100 N/mm$^2$ is also used.

As an alternative to the naturally hard alloyed speoial grade steel, it is also possible to obtain high strengths by means of a heat treatment of the rails after the rolling procedure. The heat treatment is usually limited to the part of the rail near the tread. The chemical composition of such rails corresponds approximately to the rails having a minimum tensile strength of 900 N/mm$^2$, wherein the pearlitic structure is extremely finely lamellar due to the heat treatment, resulting in an appropriately high hardness or strength. The present invention is directed to improving the hardness patterns of aluminothermically produced welds in the head parts of this type of rail.

The aluminothermic welding process is a fusion welding process and leads to the characteristic formation of the welding area in the form of an intermediate cast portion which is composed of aluminothermically produced steel and dissolved rail steel and which is located centrally in the originally present gap between the two ends of the rails, and a heat-influenced zone to the right and left of the welding seams.

FIG. 1a of the drawing shows the above-described portions in a schematic longitudinal sectional view through the plane of symmetry of a finely pearlitized (head-hardened) rail. Reference numeral 1 denotes the intermediate cast portion composed of aluminothermically produced steel and melted rail steel. The two heat-influenced zones 3 border the intermediate cast portion 1 at weld lines 2. Rail steel 4 which has not been influenced by heat is located adjacent heat-influenced zones 3. Reference numeral 5 denotes the finely pearlitized rail head parts.

The above-described configuration is extremely important for the wear behavior during railroad operations. The hardness and, thus, the strength of the welding seam and, consequently, the wear resistance can be influenced rather precisely by the freely selectable chemical composition of the aluminothermic steel, when the cooling speed of the weld is predetermined. Accordingly, the hardness of the intermediate cast portions represents no problems for rail welding with respect to wear technology. However, the situation is different within the two heat-influenced zones. In the heat-influenced zones, the given chemical composition of the rail and the cooling rate of the weld together determine the hardness distribution. Within the heat-influenced zones, the hardness increases seen in longitudinal direction of the rails with increasing distance from the center of the welding seam, until a minimum value is passed at the border between the heat-influenced zone and the rail steel which is not influenced by heat. This is where the so-called soft-annealed zone is located. Since the resistance to wear also decreases with decreasing hardness, an increased wear, particularly in the heat-influenced zones, must be expected during railroad operations.

The increased hardness within the heat-influenced zones is due to metal/physical reasons. The rail steel is austenitized in the greatest portion of the heat-influenced zones adjacent the intermediate cast portions. On the other hand, in the portion of the heat-influenced zones remote from the welding seam, a maximum temperature of 600°–700° C. is reached in the rail. During cooling of the weld, different structures are formed in the heat-influenced zones:

coarse-grained, hard pearlite at the weld line, i.e., at the transition between intermediate cast portion and heat-influenced zones;

spheroidite soft globular pearlite at the transition between the heat-influenced zones and the rail steel which is not influenced by heat, i.e., at the end of the heat-influenced zone.

Since the cooling rate of the aluminothermic weld and the chemical composition of the rails is predetermined, a certain structure is obtained depending on the quality of the rail steel and, thus, a certain hardness distribution in the heat-influenced zones seen in longitudinal direction of the rail is obtained.

When welding naturally hard rails, i.e., rails which were not subjected to heat treatment by the manufacturer after rolling, the hardness distribution within the heat-influenced zones depends on the chemical composition of the rail steel. The alloy elements C, Mn, V, Cr and others influence the hardness level through the transformation behavior of the rail steel and/or through the formation of carbide. However, the hardness of rails which have not been influenced by heat are also only controlled through these two mechanisms during cooling after the rolling procedure. Thus, when such naturally hard rails are welded, always approximately the same difference results between the hardness of the non-uniform rail and the hardness pattern in the heat-influenced zones, independently of the rail steel analysis. From the viewpoint of wear technology, this difference can be tolerated in such aluminothermical welds.

In the case of finely pearlitized rails which are heat-aftertreated, in which the hardness level is "artificially" raised after rolling, a greater difference occurs in the hardness because the original finely lamellar pearlite structure is destroyed and the hardness distribution in the heat-influenced zones after welding automatically is that of a welded naturally hard rail having minimum tensile strength of 900N/mm$^2$. This is due to the same chemical composition of the two rail steel grades.

FIG. 1b shows the respective hardness patterns at the tread seen in longitudinal direction of the rail. Curve I corresponds to the hardness pattern of a weld of finely pearlitized (head-hardened) rails and curve II corresponds to the hardness pattern of a weld of naturally hard rails having a minimum tensile strength of 900N/mm². Compared to the welding material and the non-influenced rails, the tread of the finely pearlitized rails is subjected in the regions of the heat-influenced zones to a relatively stronger wear than is the case in a weld of naturally hard rails. For this reason, welding technology for finely pearlitized rails must meet higher requirements.

In practice, two methods of aluminothermically cast-welding between rails have been found particularly useful and are used predominantly. The methods are those disclosed in British patent 1,402,964 and U.S. Pat. No. 3,942,579.

The method according to the British patent 1,402,964 includes the combination of the following steps:
a) The width of the gap between two rail ends to be welded together is set at 1 to 2 times the thickness of the web of the rails;
b) the shape of the casting mold is selected in such a way that the welding bead has a width of 2 to 4 times the thickness of the web of the rail and a depth of 0.15 to 0.6 times the thickness of the web;
c) the width of the ribbon-shaped flame of the burner for preheating is set at 1.5 to 2.5 times the thickness of the web of the rails.

When carrying out rail welding by means of the above-described method, a preheating period for the rail ends surrounded by the mold halves of approximately 6 to 10 minutes is required.

The method according to U.S. Pat. No. 3,942,579 includes preheating the rail ends to be welded together within a period of time of at most 2 minutes to a temperature of between a minimum of 300° C. and a maximum of 700° C., wherein the weight of the aluminothermic mixture is 0.15 to 0.25 parts by weight of the weight per meter of the rails to be welded together. This method is considered a welding process with short preheating.

Compared to methods using normal preheating, the steep temperature gradient in longitudinal direction of the rails resulting from short preheating leads to a smaller expansion of the heat-influenced zones. In this method, the drop of hardness in the heat-influenced zones is limited to a smaller area seen in longitudinal direction of the rails. This has a positive effect on the wear behavior during railroad operations. For this reason, this method is particularly preferred for the process of the present invention.

The configuration of the intermediate cast portion and of the heat-influenced zones of such a weld can be influenced by modifying the design of the casting mold. For example, it is possible to obtain a greater dissolution of the rail ends and, thus, a greater intermediate cast portion seen in longitudinal direction of the rail in a layer underneath the tread which is not too thick. This results in an approach of the weld line to the rail in the area of the tread which has not been influenced by heat and which solely determines the wear of the rail and of the weld. However, by utilizing a suitable casting technology, it is possible to maintain unchanged the configuration of the intermediate cast portion and of the heat-influenced portions and of the heat-influenced zones in the remaining cross-section of the rail, so that it is possible to maintain unchanged the configuration of the intermediate cast portions and of the heat-influenced zones in the remaining cross-section of the rail, so that the outer limits of the heat-influenced zones are "held" at the running surface. In this case, the heat-influenced zones are advantageously made smaller at the running surface.

An improvement of the hardness pattern in the heat-influenced zones can be obtained in a known manner by an additional heat treatment of the rails in the welding area. Independent of whether an aluminothermical welding procedure or a flash butt-welding procedure is carried out, such a heat treatment is conventionally carried out when the weld has cooled to ambient temperature or at least to a temperature below 700° C., i.e., to a temperature at which the austenite/pearlite transformation has concluded. The weld is again austenitized by means of a suitable gas burner device and is subsequently cooled in an accelerated manner by applying compressed air or a mixture of compressed air/water or a cooling medium having the same effect. However, this method has the disadvantage that it is difficult to carry out on rails which have already been laid and that additionally a complicated apparatus is required which must be transported to the construction site.

SUMMARY OF THE INVENTION

It is the object of the present invention to provide a method which makes it possible to improve the hardness pattern in the heat-influenced zones in the area near the tread without having to again heat the weld. It must be possible to carry out this method with a simple apparatus at the construction site on the rail which has already been laid and the method must have a high degree of operational safety. Moreover, the method must be economical.

In accordance with the present invention, the above object is met by applying a cooling agent to the surfaces of the rail heads of the rail portions adjacent the two casting mold halves, wherein the cooling agent is applied after the molten steel has been poured until the steel has solidified, particularly until the projecting weld material and the casting mold halves have been sheared off.

The cooling agent preferably used is compressed air or water or a mixture of compressed air and water.

As a result, even though the weld area is covered by the two mold halves, the method according to the invention surprisingly removes so much heat from the weld area that the heat-influenced zones which are inevitably formed in the area near the treads becomes substantially smaller and, moreover, has a significantly lower hardness drop.

When cooling is effected by means of compressed air, the compressed air is preferably produced directly at the location of consumption by means of a suitable compressor. Of course, it is also possible to transport compressed air-bottles to the construction site if a suitable compressor is not available or cannot be utilized for other reasons. Water may be added to the compressed air through a bypass.

The application of cooling agent is stopped after the welding material has solidified. A suitable and preferably hydraulic shearing unit is used for shearing off the mold halves together with the risers and the major parts of the welding beads at the rail head. After further cooling, the rail head is ground in the known manner to obtain the correct profile.

The various features of novelty which characterize the invention are pointed out with particularity in the claims annexed to and forming a part of this disclosure.

For a better understanding of the invention, its operating advantages and specific objects attained by its use, reference should be had to the drawing and descriptive matter in which there is illustrated and described a preferred embodiment of the invention.

DESCRIPTION OF THE PREFERRED EMBODIMENT

Figure 1A:
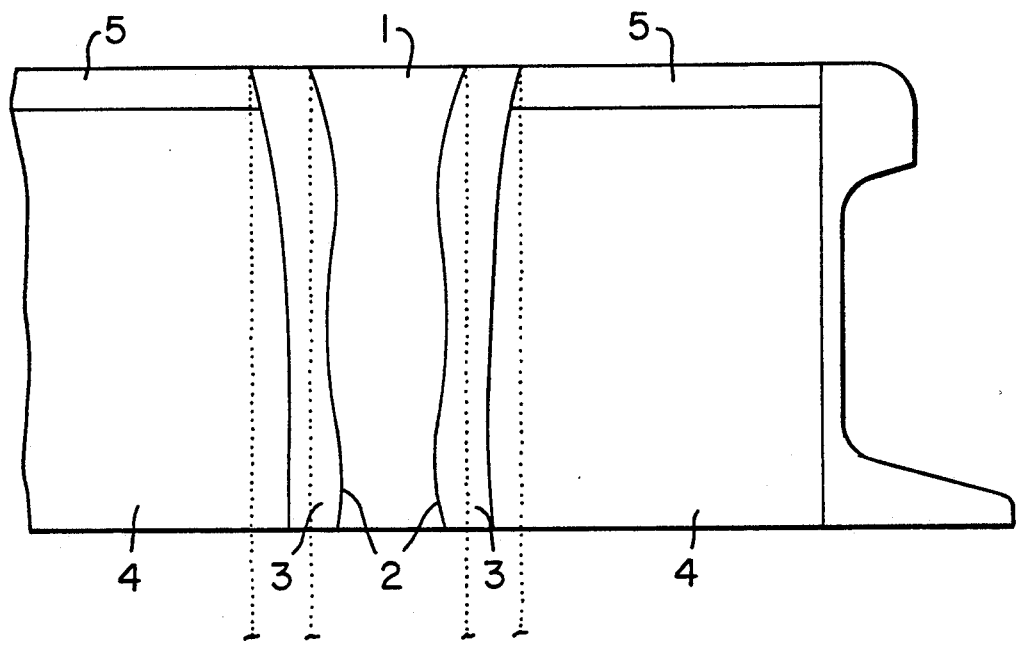
FIG. 1A is a schematic longitudinal sectional view through the rail.
Figure 1B:
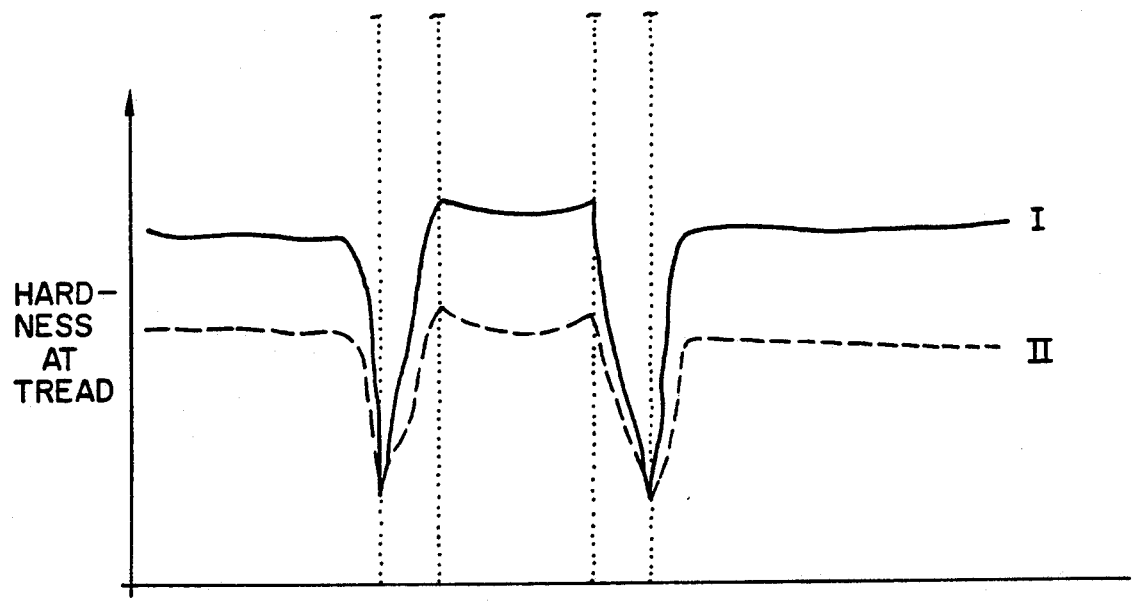
FIG. 1b is a diagram showing the hardness of the rail at the tread.

FIGS. 1a and 1b the drawing have been described in detail hereinabove.

Figure 2:
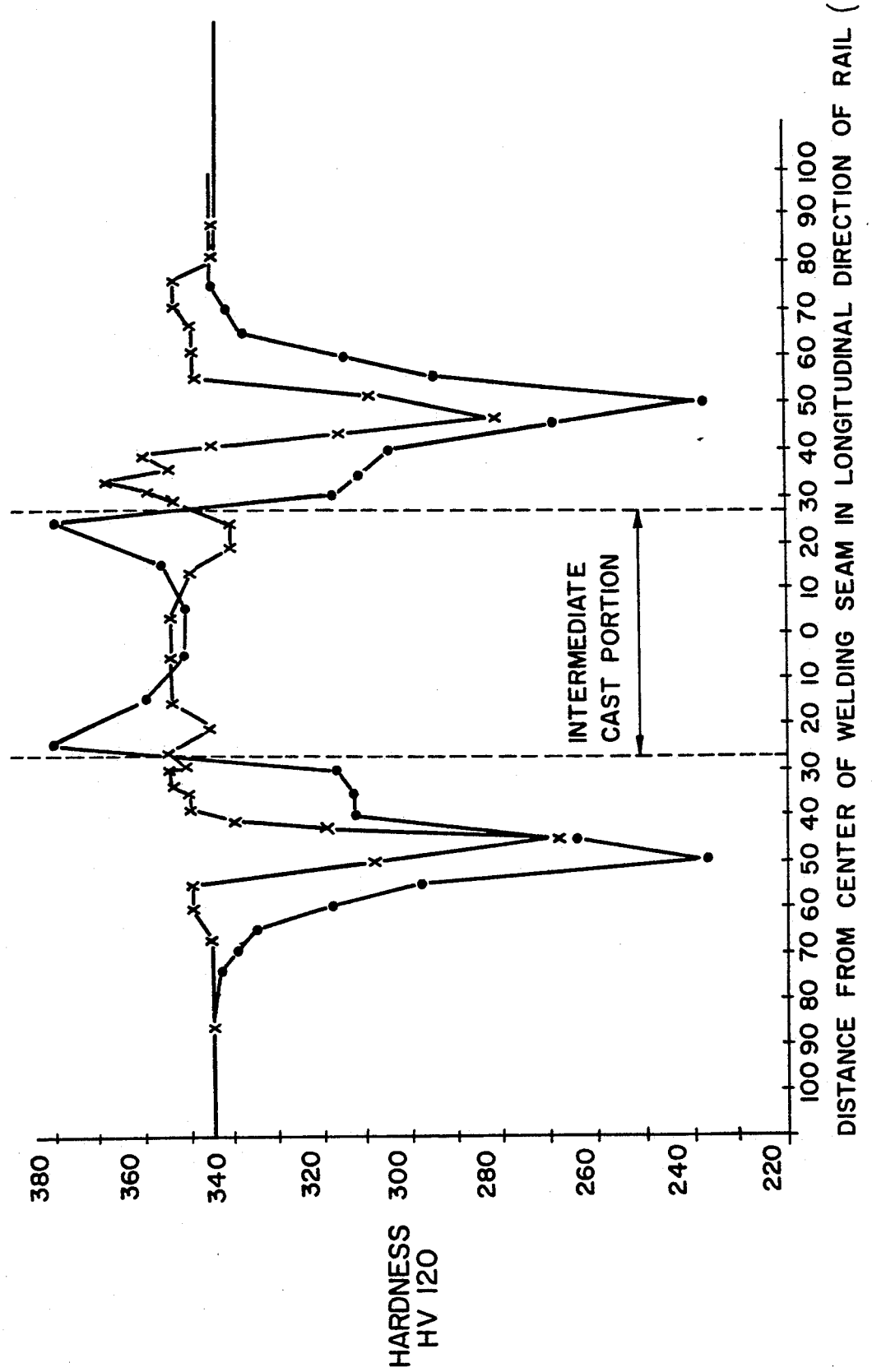
FIG. 2 is a diagram showing the hardness of the weld produced in accordance with the present invention as compared to a conventional method.

In order to demonstrate the superior properties which can be obtained with the method of the invention, FIG. 2 shows the hardness pattern of a weld produced according to the method of the invention, compared to the hardness pattern of a weld without the application of a cooling agent as provided by the invention. Welding was carried out on finely pearlitized UIC 60-rails. The method according to U.S. Pat. No. 3,942,579 was employed. Preheating time was 2 minutes. To the aluminothermic reaction mixture were added alloy additives in such an amount and such a quality that the hardness of the intermediate cast portions corresponded to that of the finely pearlitized rails in the initial state. The application of compressed air to the rail ends in the immediate vicinity of the mold halves was carried out immediately after the aluminothermically produced steel melt was poured and was maintained for 4 minutes.

When the method of the invention was used, the hardness pattern curve x-x-x-x-x was obtained. Without using the method of the invention, the hardness pattern curve _._._._._ was obtained.

It is apparent that the hardness pattern in the heat-influenced zones of the weld with the application of cooling agent is considerably better with respect to the wear behavior under railroad operation than is the hardness pattern in the heat-influenced zones where the cooling medium has not been used. The hardness valley in longitudinal direction of the rail is significantly narrower. This is because the lowest hardness value has been moved toward the middle of the welding seam. Since this lowest hardness value also identifies the end of the heat-influenced zone, it is also possible to state that, advantageously, the extension of the heat-influenced zones in longitudinal direction of the rails is also smaller.

However, the hardness distribution in that part of the heat-influenced zone which is covered by the casting mold is also surprisingly improved as compared to the weld without the application of cooling agent. Moreover, it is surprising that the lowest value of the hardness in the method of the invention is raised to a substantially higher level as compared to the corresponding weld without the application of cooling agent. This is surprising because, independently of the cooling rate, an area must always be present at a certain distance from the welding seam center in the two welded rails in which a maximum temperature range of 600°-700° C. is reached during welding. This is the area in which the pearlite decomposes from the lamellar structure into globular structure with low hardness. By applying the cooling agent, this agent is moved more closely toward the center of the welding seam, while the extent of the formation of globular pearlite must apparently have been reduced by cooling. This was unexpected.

In accordance with a further development of the method of the invention, after the projecting welding material and the casting mold halves have been sheared off, the application of cooling agent at the surface of the rail head is continued and the intermediate cast portion is also cooled. In this case, an aluminothermic mixture can be used which has smaller quantities of additions of elements which increase the hardness because the intermediate cast portion is hardened by the application of the cooling agent and the resulting more rapid cooling. As a result, in the intermediate cast portion of the rail web and rail base, a softer, more ductile steel is present in the desired manner because no cooling was carried out at these locations. This is a desired and particularly advantageous result because the wheel load acting as bending stress on the rail base and as dynamic stress on the rail web can be better withstood.

The casting molds used in accordance with the state of the art are usually sealed with loam sand to prevent the aluminothermic steel melt from flowing out. This has the result that a relatively large area of the rail half to be welded is covered and counteracts the heat removal when the method of the invention is carried out. It is desired that the heat removal is quick and that the rail area covered by the casting mold is as small as possible, so that as large as possible an area of the rail end can be made accessible to the application of cooling agent in order to obtain narrow heat-influenced zones.

Therefore, the present invention also relates to a casting mold composed of two mold halves which is particularly suitable for carrying out the method of the invention. In accordance with the invention, the mold halves 1 of the casting mold have in the inner surfaces 2 facing the rail section a groove 3 extending along the outer contour thereof for receiving a sealing paste. As a result, the sealing effect is in the interior portion of the mold, so that the area to which compressed air can be supplied is maximized.

Figure 3:
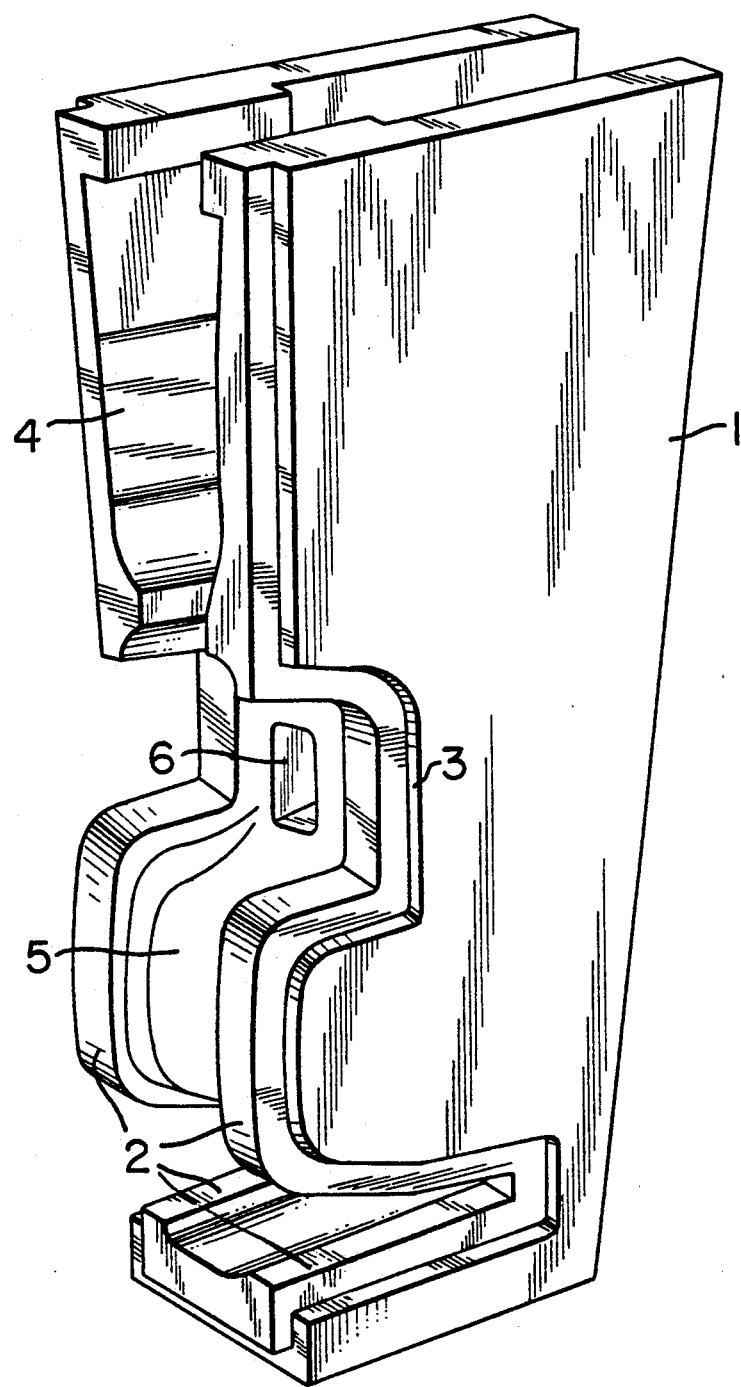
FIG. 3 is a perspective view of a casting mold half for carrying out the method according to the present invention.

FIG. 3 of the drawing shows a mold half 1 according to the present invention. Two symmetrically constructed casting mold halves are placed at the gap between the rail ends and are clamped to the rail. The casting mold halves 1 form in the upper portion thereof a feeding head 4. The lower portions thereof rest with surfaces 2 against the rail ends. A groove 3 is provided along the outer contour of the surfaces 2. Groove 3 serves to receive a sealing paste. This sealing paste or material effects a sealing action of the casting mold relative to the rail and prevents aluminothermically produced melt from running out. The recess 5 of the casting mold half 1 corresponds to the welding bead which is formed during welding. Reference numeral 6 denotes a riser inlet.

A kneadable sealing paste suitable for sealing may have the following composition.

| | |
|---|---|
| Quartz powder | 40–50 parts by weight |
| Water glass | 20–30 parts by weight |

| | | |
|---|---|---|
| Talc | 10-30 | parts by weight |
| Bentonite | 2-10 | parts by weight |
| Water | 0-3 | parts by weight |
| Glycol | 0-3 | parts by weight |

The method according to the invention will be explained in more detail in the following with the aid of an example.

Finely pearlitized rails of the type UIC 60 are used whose steel has the following composition in % by weight:

| | | | | | | | |
|---|---|---|---|---|---|---|---|
| C | 0.78 | Mn | 1.06 | Si | 0.36 | P | 0.02 |
| S | 0.03 | Cr | 0.06 | V | 0.002 | Ni | 0.02 |
| Cu | 0.02 | Remainder Fe. | | | | | |

Because of the fine pearlitization of the rail head, the hardness of the rail near the tread is approximately 343 HV 120.

For welding, the rails are aligned and spaced with a gap of 24 to 26 mm. Welding is carried out in accordance with the method of U.S. Pat. No. 3,942,579. A two-piece casting mold according to the present invention is used. After the two casting mold halves have been put in place, the casting mold halves are fixed to the rails with a conventional clamp device. Subsequently, for sealing the casting mold halves relative to the rail ends, a sealing paste in the form of bars having a diameter of 12 mm are pressed into the circumferential groove 3. The sealing paste has the following composition in parts by weight:

| | |
|---|---|
| Quartz powder | 46 |
| Waterglass | 26 |
| Talc | 19.5 |
| Bentonite | 5 |
| Water | 1.5 |
| Glycol | 2 |

The aluminothermic mixture used in the method is a conventional mixture of iron oxide, aluminum and alloy components which include C, Mn and other elements. A crucible lined with refractory material is arranged above the casting mold. The crucible serves to receive the aluminothermic mixture and has in the lower part thereof an outlet nozzle with a cylindrical tap member. The tap member is covered with refractory disks of mineral fibers which are destroyed by the heat resulting from the aluminothermic reaction and, thus, ensure an automatic tapping of the aluminothermically produced steel from the crucible at the predetermined moment.

The rail ends are now preheated for 2 minutes by means of a propane/oxygen burner. They reach a temperature of approximately 600° C. Subsequently, the aluminothermic mixture is ignited in the known manner. After the aluminothermic reaction has concluded and the formed slag floats at the top, the closure of the crucible melts through and the steel melt flows into the casting mold cavity.

A compressed air gun fastened at each rail end is now guided in an oscillating motion around the rail head at both sides of the casting mold at a distance of about 100 mm from the rail head surface. The area of the rail head to which the compressed air is applied extends beginning at the casting mold over a region of approximately 100 mm seen in longitudinal direction of the rail. The air pressure in the supply hoses to the two compressed air guns is adjusted to approximately 5 bar. The application of compressed air is concluded after 4 minutes.

Subsequently, the welding beads and projecting risers are sheared off together with the casting mold halves by means of a hydraulic shearing unit at the rail head of the weld. After the weld has sufficiently cooled, the weld is ground to obtain the correct profile.

The hardness pattern of the weld produced in this manner corresponds to the hardness pattern curve x-x-x-x-x in FIG. 2.

While a specific embodiment of the invention has been shown and described in detail to illustrate the application of the inventive principle, it will be understood that the invention may be embodied otherwise without departing from such principles.

We claim:

1. In a method of cast-welding between finely pearlitized rails, the method including pouring molten aluminothermically produced steel welding material into a casting mold which includes two casting mold halves and surrounds the two ends of the rails, the improvement comprising, after the molten steel welding material has been poured into the casting mold, applying a cooling agent to the rail head surfaces at the rail ends adjacent the two casting mold halves until the steel welding material has solidified.

2. The method according to claim 1, wherein the cooling agent is applied until projecting welding material and the casting mold halves have been sheared off.

3. The method according to claim 1, wherein the cooling agent comprises compressed air.

4. The method according to claim 1, wherein the cooling agent comprises water.

5. The method according to claim 1, wherein the cooling agent comprises a compressed air/water mixture.

6. The method according to claim 1, further comprising continuing applying the cooling agent after projecting welding material and the casting mold halves have been sheared off and additionally applying cooling agent to an intermediate cast portion between the rail ends.

* * * * *